(12) United States Patent
Scheu et al.

(10) Patent No.: US 8,909,685 B2
(45) Date of Patent: Dec. 9, 2014

(54) PATTERN RECOGNITION OF A DISTRIBUTION FUNCTION

(75) Inventors: Sylvia Scheu, Sandhausen (DE); Matthias Buehl, Heidelberg (DE); Boris Oliver Kneisel, Schwetzingen (DE)

(73) Assignee: SAP SE, Walldorf (DE)

( * ) Notice: Subject to any disclaimer, the term of this patent is extended or adjusted under 35 U.S.C. 154(b) by 381 days.

(21) Appl. No.: 13/327,801

(22) Filed: Dec. 16, 2011

(65) Prior Publication Data

US 2013/0159370 A1 Jun. 20, 2013

(51) Int. Cl.
*G06F 17/10* (2006.01)
(52) U.S. Cl.
USPC .......................................................... 708/300
(58) Field of Classification Search
None
See application file for complete search history.

(56) References Cited

U.S. PATENT DOCUMENTS

| | | | |
|---|---|---|---|
| 7,907,690 B2* | 3/2011 | Taylor et al. ................... | 375/350 |
| 2007/0242858 A1* | 10/2007 | Aradhye et al. ............... | 382/115 |
| 2010/0223311 A1* | 9/2010 | Sugiyama ...................... | 708/322 |
| 2010/0262425 A1* | 10/2010 | Tanabe et al. .................. | 704/233 |
| 2012/0004893 A1* | 1/2012 | Vaidyanathan et al. ......... | 703/11 |
| 2013/0159370 A1* | 6/2013 | Scheu et al. ................... | 708/422 |

\* cited by examiner

*Primary Examiner* — David H Malzahn

(57) ABSTRACT

Various embodiments of systems and methods for pattern recognition of a distribution function are described herein. An influenced distribution function corresponding to an influenced attribute is compared with other distribution functions corresponding to other attributes. Based on the comparison, a correlation is determined between the influenced distribution function and an influencing distribution function from the other distribution functions. Based on the determination, a raw distribution function corresponding to an influenced attribute is extracted using the influenced distribution function and the influencing distribution function. The extracted raw distribution function and the influencing distribution function may be classified.

19 Claims, 9 Drawing Sheets

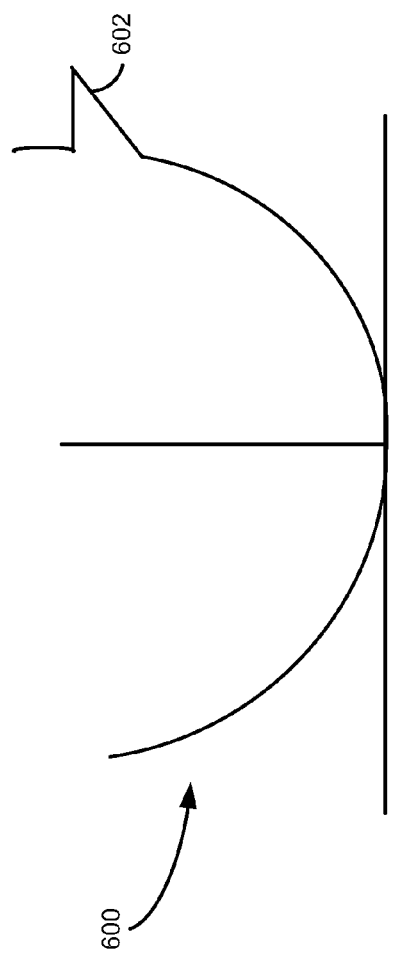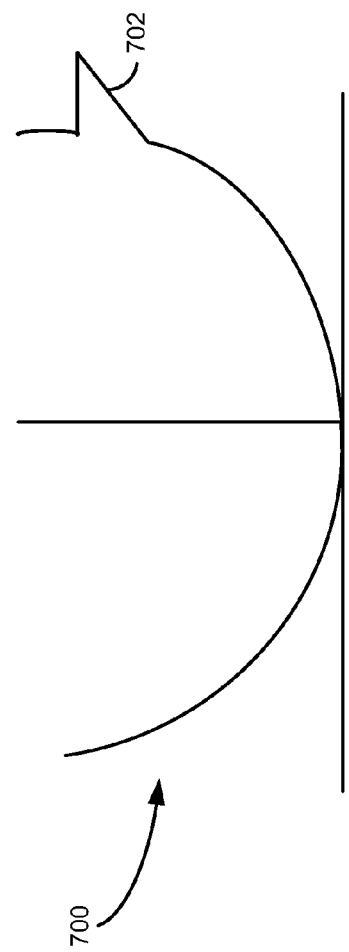

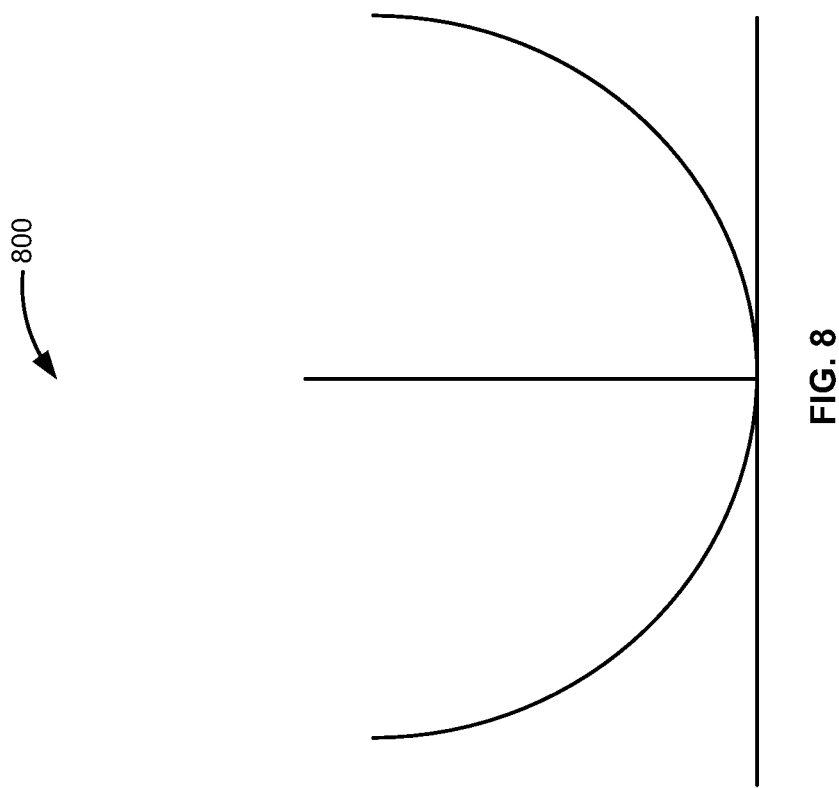

PATTERN RECOGNITION OF A DISTRIBUTION FUNCTION

FIELD

Embodiments generally relate to computer systems, and more particularly to methods and systems for recognizing pattern of a distribution function.

BACKGROUND

In recent years, Business Intelligence (BI) tools have become increasingly important for large business enterprises and other organizations. BI tools are often used to create simulation models and predictions in order to support better business decision making. Typically, BI tools use data stored in a database for creating simulation models and predictions for an object. The data may be used for determining distribution function of the object. The distribution function is a function that represents the distribution of an object. Based on the determined distribution function of the object, BI tools predict future values of the object or simulate the object. For correctly predicting values or simulating an object, the BI tool may require raw distribution function of the object. A raw distribution function of the object represents the distribution of the object without the influence of any other object. The raw distribution of the object in turn is dependent on availability of raw data corresponding to the object at a desired granularity.

Enterprise applications demand and generate vast amounts of data during a typical business cycle. Data may include transaction data, statistical data, and some other secondary data. Due to memory constraints of a database, only portions of this data are stored in a database, for example compliance related data or data related to analytics may be stored in the database whereas other data may not be stored at all. Furthermore, analytical data may also be aggregated in a pre-defined manner to save database resources. Due to these practices, the raw data of the object may not be available at a desired granularity for determining the raw distribution function of the object. This may lead to limited analytical and simulation possibilities as the determined distribution function may not correctly predict or simulate values of the object.

SUMMARY

Various embodiments of systems and methods for pattern recognition of a distribution functions are described herein.

In one aspect, an influenced function corresponding to an influenced attribute is compared with other distribution functions corresponding to other attributes.

In another aspect, based on the comparison, a correlation is determined between the influenced distribution function and an influencing distribution function from the other distribution functions, the influencing distribution function corresponds to an influencing attribute from the other attributes.

In still another aspect, based on the determination, the raw distribution function corresponding to the influenced attribute is extracted using the influenced distribution function and the influencing distribution function.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 6 is an exemplary graph illustrating an influenced distribution function of the "response time" influenced attribute determined by the distribution function determination unit of FIG. 5, according to an embodiment.

FIG. 7 is an exemplary graph illustrating an influencing distribution function of the "system load" influencing attribute determined by the distribution function determination unit of FIG. 5, according to an embodiment.

FIG. 8 is an exemplary graph illustrating a raw distribution function of the "response time" influenced attribute extracted by the distribution function extraction unit of FIG. 5, according to an embodiment.

DETAILED DESCRIPTION

Embodiments of techniques for pattern recognition of a distribution function are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
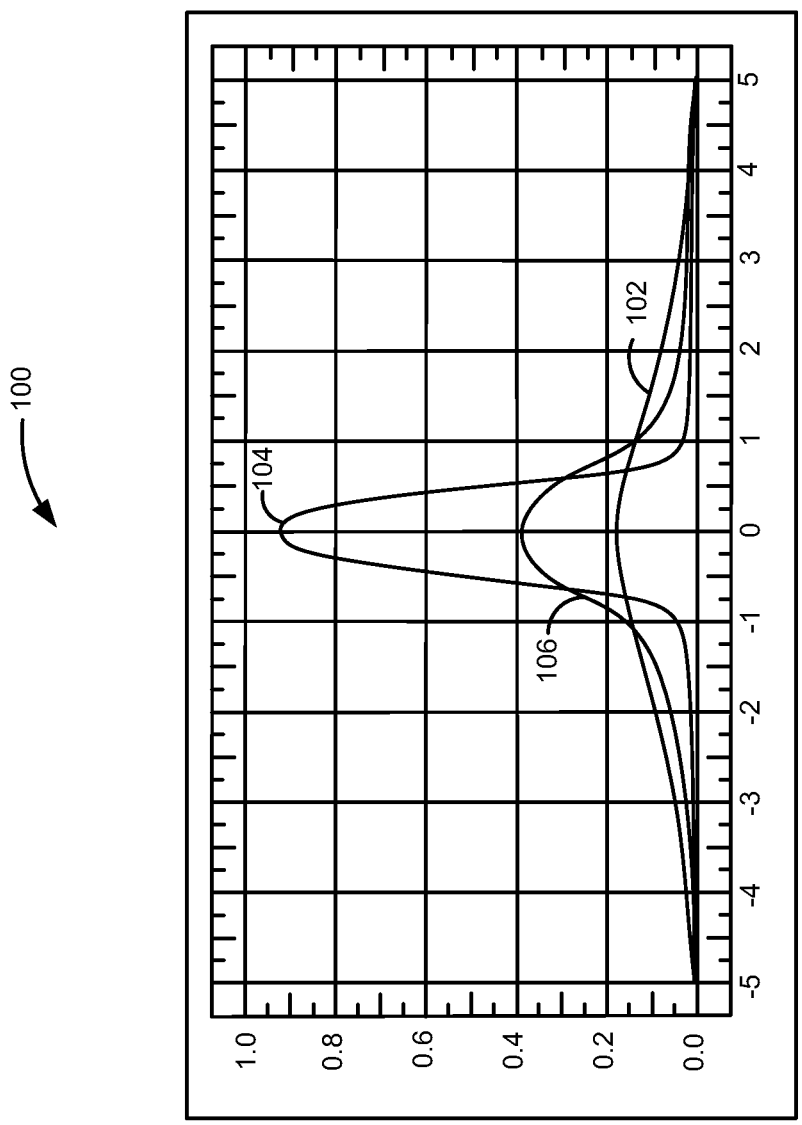
FIG. 1 is an exemplary graph illustrating an influenced distribution function corresponding to an influenced attribute, an influencing distribution function corresponding to an influencing attribute, and a raw distribution function corresponding to the influenced attribute, according to an embodiment.

FIG. 1 is an exemplary graph 100 illustrating an influenced distribution function 102 corresponding to an influenced attribute, an influencing distribution function 104 corresponding to an influencing attribute, and a raw distribution function 106 corresponding to the influenced attribute, according to an embodiment. An attribute may refer to a property or a characteristic. In one embodiment, the attribute represents characteristics or values in a database table. The columns of the database table may include the attributes and the rows of the database table may include the data (distribution data) corresponding to the attribute. For example, a "share value" database table may include a "share price" column. In this case, "share price" is an attribute of the "share value" database table. The rows of the "share values" database table may include 5$, 5$, 5$, and 5$ which represents share price values (distribution data corresponding to the "share price" attribute) of a company A for quarter 1, quarter 2, quarter 3, and quarter 4, respectively, of year 2012. In one embodiment, distribution is an arrangement of values of a variable showing their observed or theoretical frequency of occurrence. A function that represents the distribution of the attribute is referred to as a distribution function. In one embodiment, the distribution function represents the distribution data corresponding to the attribute. For example, the distribution data 5$, 5$, 5$, and 5$ corresponding to company A is constant for all the quarters and therefore may be represented by a "straight line" distribution function, where "straight line" represents the pattern or shape of the distribution function. The "straight line" distribution function represents the distribution of the "share price" (attribute) for the company A.

In one embodiment, the attribute may be an influenced attribute, which is influenced by other attributes. In one embodiment, the distribution data of the influenced attribute may be dependent on the distribution data of the influencing attributes. In case the distribution data of the influencing attribute changes, the distribution data corresponding to the influenced attribute is also changed. A distribution function corresponding to the influenced attribute may be referred to as an influenced distribution function. For example, the "share price" attribute, in the above example, may be influenced by other influencing attributes such as "political conditions", "lunar calendar", etc. In this case, if there is a war (which is a distribution data for an influencing attribute "political condition") in quarter 1 of year 2012 then the distribution data corresponding to the "share price" influenced attribute may decrease in quarter 1 of year 2012 compared to other three quarters of 2012. Similarly, in case people buy shares based on the "lunar calendar" then the distribution data corresponding to the "share price" attribute may increase on days which are marked as "lucky" in the "lunar calendar". A distribution function corresponding to the influenced attribute may be referred to as an influenced distribution function. As the influenced distribution function is influenced by other distribution functions, the BI tool cannot provide correct predictions or simulations for the influenced attribute based on the influenced distribution function. The influencing attribute influencing the influenced attribute may in turn itself be influenced by other attributes. In the above, the "straight line" distribution function is an influenced distribution function corresponding to the "share price" influenced attribute. As the "straight line" influenced distribution function represents the distribution of the "share price" influenced attribute, the future values of the "share price" influenced attribute cannot be correctly predicted using the influenced distribution function.

As shown in FIG. 1, the influenced distribution function 102 and the influencing distribution function 104 represent the distribution function corresponding to an influenced attribute and an influencing attribute, respectively. In FIG. 1, it is assumed, that the influenced attribute is influenced by the influencing attribute. A raw distribution function 106, which represents the distribution of the influenced attribute, without the influence of the influencing attribute, is extracted by removing the influence of the influencing distribution function 104 from the influenced distribution function 102. In one embodiment, a raw distribution function represents the "original" distribution of the influenced attribute without the influence of other attributes. As the extracted raw distribution function 106 represents the distribution function of the influenced attribute without the influence of the influencing attribute, the raw distribution function 106 can be used for correctly predicting future values for the influenced attribute. For example, consider that the influenced distribution function 102 represents the distribution of the "share price" influenced attribute, in the above example, and the influencing distribution function 104 represents the distribution of the "political condition" influencing attribute. As discussed above, the "political conditions" influencing attribute influences the "share price" influenced attribute. In this case, the raw distribution function 106 represents the "original" distribution of the "share price" influenced attribute obtained by removing the influence of the "political condition" influencing distribution function 104 from the "share price" influenced distribution function 102. The obtained "share price" raw distribution function 106 may then be used for predicting the "share price" values, for example "share price" of company A for the year 2012.

Figure 2:
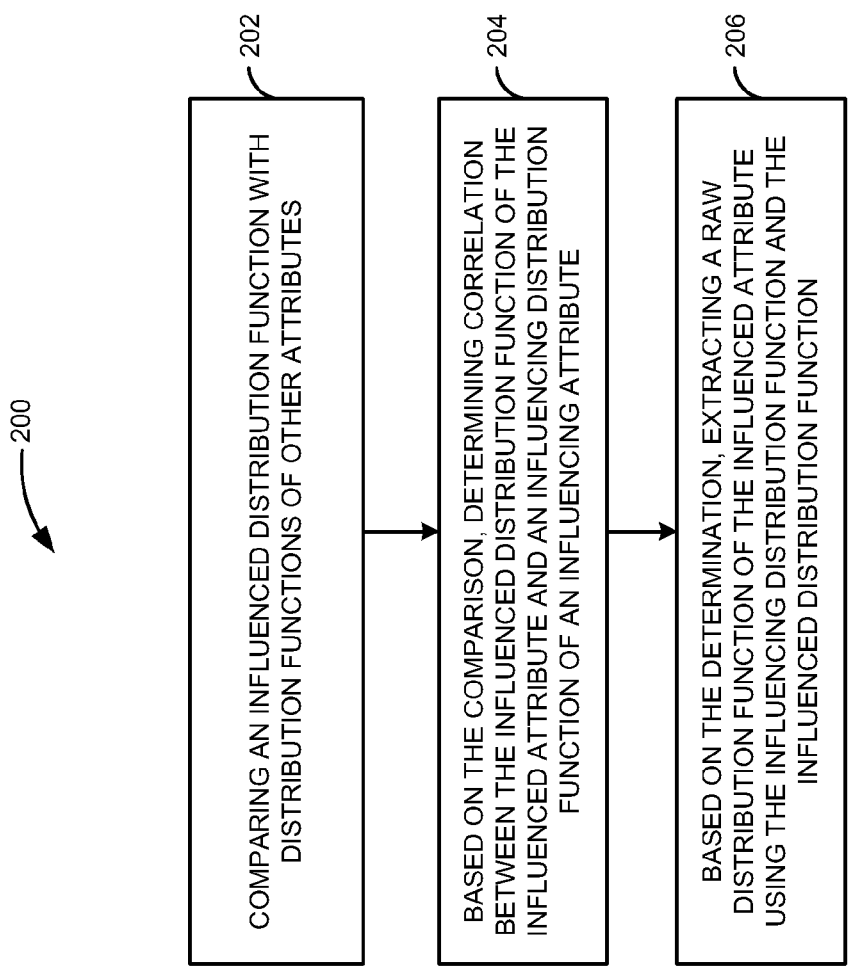
FIG. 2 is a flow diagram illustrating a method for extracting a raw distribution function of an influenced attribute, according to an embodiment.

FIG. 2 is a flow diagram 200 illustrating a method for extracting a distribution function of an influenced attribute, according to an embodiment. Initially, at block 202, an influenced distribution function corresponding to an influenced attribute is compared with other distribution functions corresponding to other attributes. As discussed above, the influenced distribution function of the influenced attribute represents the distribution of the influenced attribute, influenced by other attributes. In one embodiment, the comparison includes comparing the shape of the influenced distribution function with shape of distribution functions of other attributes. In one embodiment, the shape of an object located in some space is a geometrical description of the part of that space occupied by the object, as determined by its external boundary. For example, the shape of the distribution function may be a straight line, parabola, hyperbola, etc.

Based on the comparison at block 202, a correlation is determined between the influenced distribution function and an influencing distribution function corresponding to an influencing attribute (block 204). The influencing distribution function may be one of the distribution functions compared with the influenced distribution function at block 202. The influencing distribution function may be determined to be correlated with the influenced distribution function, if the influencing distribution function and the influenced distribution function have same shape. In one embodiment, the determined correlation between the influenced distribution function and the influencing distribution function may be an indication that the influenced distribution function is influenced by the influencing distribution function.

Finally at block 206, the raw distribution function of the influenced attribute is extracted by using the influenced distribution function and the influencing distribution function correlated to the influenced distribution function. The raw distribution function of the influenced attribute may be extracted by subtracting the influencing distribution function from the influenced distribution function. The extracted raw distribution function corresponding to the influenced attribute may then be used for predicting values for the influenced attribute.

Figure 3A:
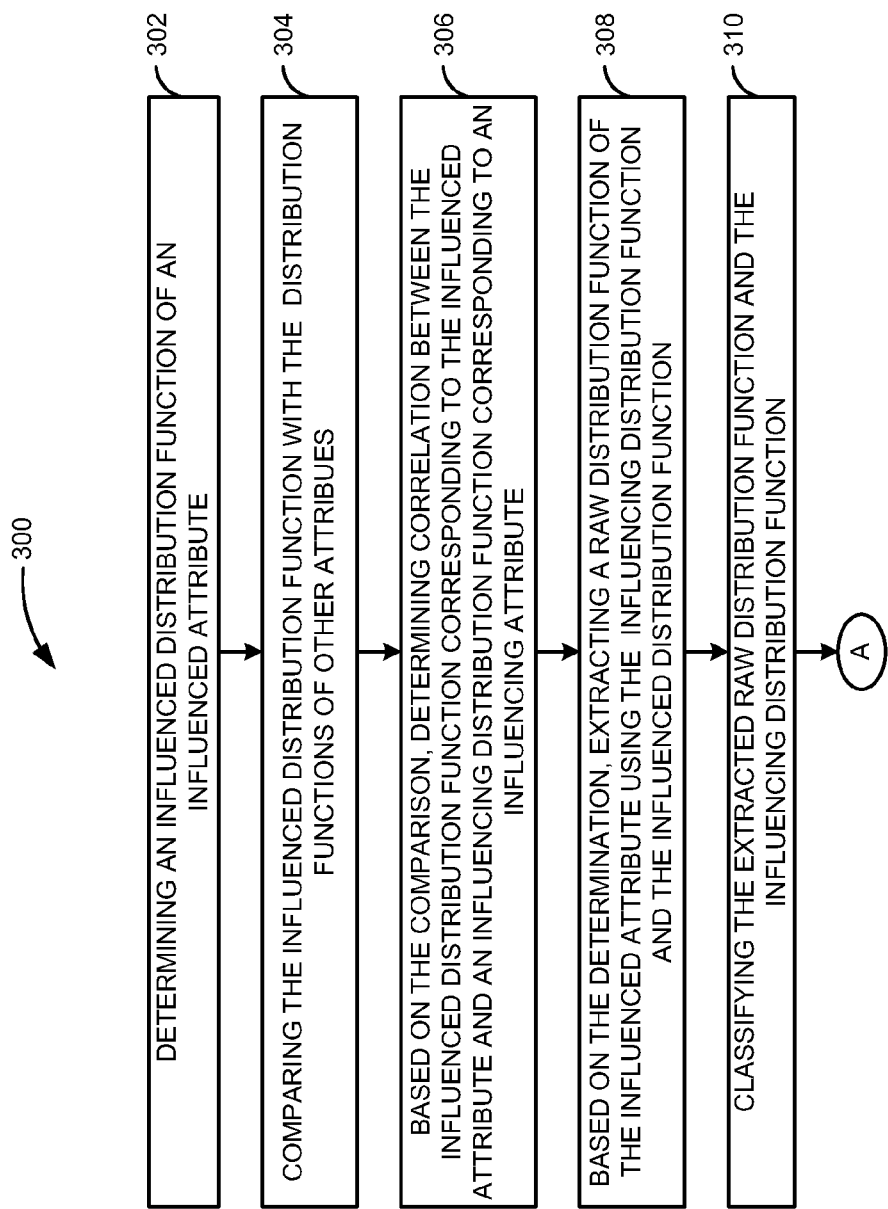
FIGS. 3A-3B is a detailed flow diagram illustrating a method for extracting a raw distribution function of an influenced attribute, according to an embodiment.
Figure 3B:
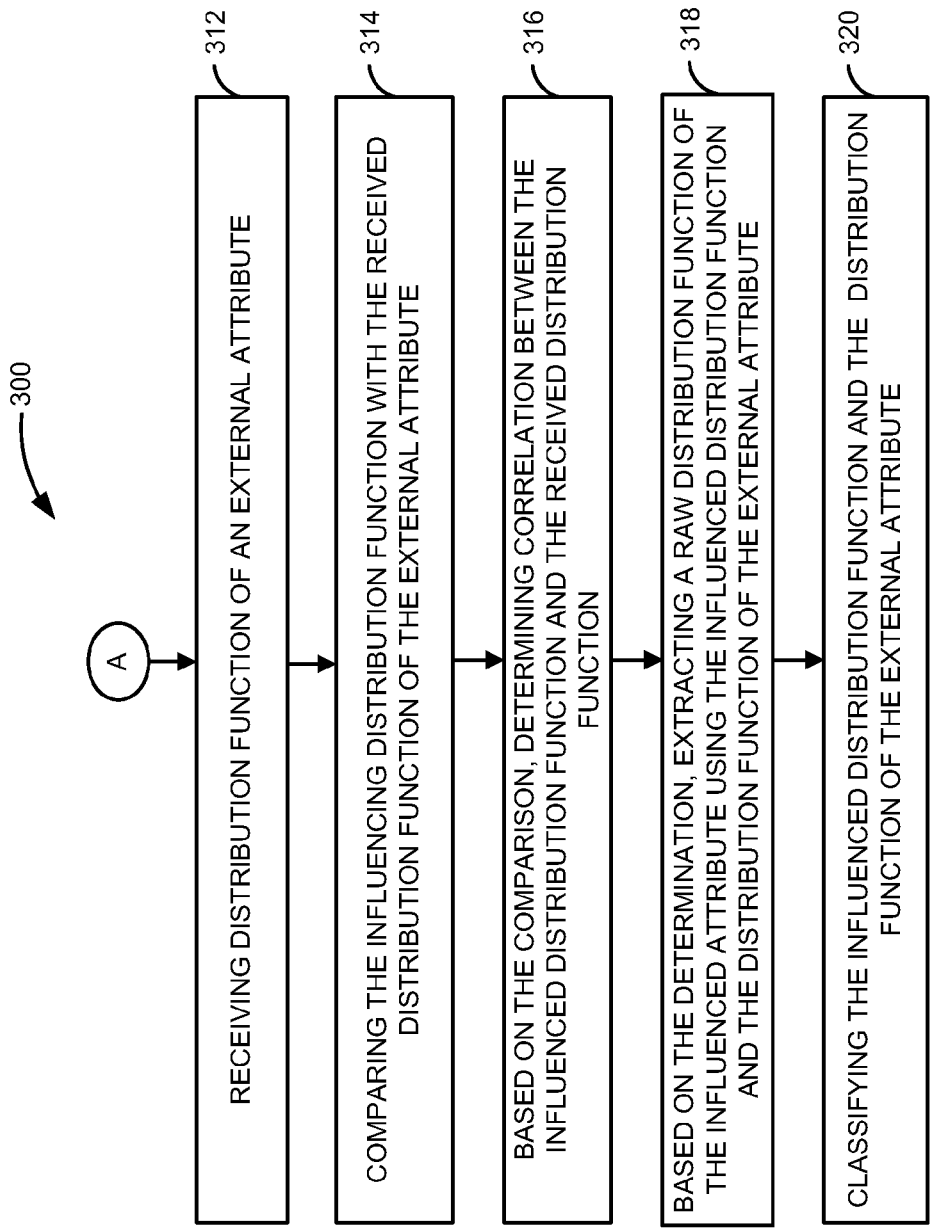

FIGS. 3A-3B is a detailed flow diagram 300 illustrating a method for extracting a distribution function of an influenced attribute, according to an embodiment. As shown, initially at block 302 an influenced distribution function corresponding to an influenced attribute is determined. As discussed above, the attribute may refer to a property or a characteristic. In one embodiment, the attribute may represent values stored in a database. The database may store distribution data corresponding to the influenced attribute. The database may also store distribution data corresponding to other attributes. The distribution data for the attributes may be received from several different sources, for example, system sensors, user input, etc. Due to memory constraints, the distribution data of a few attributes may be pre-aggregated and then stored in the database, or the system may ignore the distribution data corresponding to few attributes and may store the distribution data of other attributes. Therefore, the distribution data, stored in the database, corresponding to the influenced attribute may be influenced by the distribution data of other attributes, which influence the influenced attribute. In this case, the distribution function representing the distribution data corresponding to the influenced attribute is the influenced distribution function. For example, consider a company XYZ manufacturing ice creams. The company XYZ receives sales data of ice creams from several ice cream vendors. A "sales of ice creams" influenced attribute represents the sales data of ice creams. The "sales of ice creams" influenced attribute may be influenced by several other influencing attributes, such as "weather conditions", "availability of raw materials", etc. Due to memory constraints, a database may only store the sales data (distribution data) corresponding to the "sales of ice creams" influenced attribute. As the company XYZ only stores the sales data of ice creams it is not aware of the raw distribution function of the "sales of ice creams" influenced attribute and other influencing attributes that influence the "sales of ice creams" influenced attribute.

In one embodiment, the system stores distribution functions of standard patterns, for example, the system may store distribution functions of a straight line, a parabola, a hyperbola, etc. The system may compare the stored distribution functions of standard patterns with the influenced distribution function of the influenced attribute to determine if the influenced distribution function of the influenced attribute is similar to the distribution function of any of the standard patterns. In case of similarity, the distribution function of the standard pattern may be determined as the influenced distribution function of the influenced attribute. Two geometrical objects are similar if they both have the same shape. In geometry, two objects have the same shape if one can be transformed to the other by a combination of translations, rotations (together also called rigid transformations), and uniform scaling.

The distribution data of the influenced attribute may include "exceptions" or "outliers." These "exceptions" or "outliers" are ignored by the system during the determination of the influenced distribution function. In statistics, an "outlier" is an observation that is numerically distant from the rest of the data. A pre-determined bandwidth, within which the exceptions in the distribution data are acceptable, may also be provided to the system. In one embodiment, the system determines the influenced distribution function of the influenced attribute, using a "least squares" method. The "least squares" method is a standard approach to determine the approximate solution of over determined systems, i.e., sets of equations in which there are more equations than unknowns. The objective of the least square consists of adjusting the parameters of a model function (the influenced distribution data) to best fit a data set (the distribution data corresponding to the influenced attribute). The goal of the least square method is to find the parameter values for the model which "best" fits the data. The least squares method finds its optimum when the sum, S, of squared residuals, obtained after removing the "outliers" from the distribution data, is a minimum. In the above example, consider that the sales data (distribution data), for the "sales of ice creams" influenced attribute, received from an ice cream vendor A is as follows: 5000$, 5000$, 5000$, 3000$, 5000$, 5000$, 2000$, 5000$, and 5000$. Further, consider that the pre-determined bandwidth within which the exceptions are acceptable is 0-2. In this case, the system may remove two sales data values of 3000$ and 2000$, which are "outliers", from the sales data (distribution data). Finally, the influenced distribution function for the "sales of ice creams" influenced attribute determined from the remaining sales data values, obtained after removing the "outliers", is a "straight line" distribution function.

In one embodiment, the system may determine the influenced distribution function corresponding to the influenced attribute using an "anti-Nyquist-Shannon engine." The "anti-Nyquist-Shannon engine" analyzes the distribution data corresponding to the influenced attribute to determine if the distribution data has a symmetric distribution. In case, the distribution data has a symmetric distribution, the "anti-Nyquist-Shannon engine" determines one half of the influenced distribution function using half of the distribution data corresponding to the influenced attribute. The other half of the influenced distribution function is determined by using a symmetric operator, for example a mirror plane, on the determined half of the influenced distribution function. Therefore, using the "anti Nyquist-Shannon engine" the influenced distribution function can be determined by fewer computing operations. In one embodiment, symmetric distribution is a situation in which the values of distribution data occur at regular frequencies, and the mean, median and mode occur at the same point. If a line is drawn down the middle of the symmetric distribution, the two sides will mirror each other. For example, consider the distribution data corresponding to the influenced distribution function 102 in FIG. 1 which is a Gaussian distribution function. In one embodiment, the "Gaussian distribution function" is a continuous function which approximates the exact binomial distribution of events. The shape of the Gaussian distribution is a symmetric "bell curve". In this case, the "anti-Nyquist-Shannon engine" determines that the distribution data corresponding to the influenced attribute has a symmetrical distribution. The "anti-Nyquist-Shannon" engine determines the first half of the influenced distribution function 102 using half of the distribution data corresponding to the influenced attribute. The other half of the influenced distribution function (other half of the "bell" curve) may be determined by using a minor-plane. In one embodiment, approximation methods, for example, the Runge-Kutta method, are used for determining the influenced distribution function. The Runge-Kutta method is an iterative method for the approximation of solutions of ordinary differential equations. The distribution function of other attributes can similarly be determined based on the distribution data related to these attributes.

Next at block 304, the influenced distribution function, determined at block 302, of the influenced attribute is compared with the distribution functions of other attributes. In one embodiment, the influenced distribution function is compared with the distribution functions of internal attributes. An attribute is an internal attribute, if the distribution data corresponding to the attribute is stored in the database. In the above example, the "availability of raw material" attribute may be an internal attribute as the available raw material data (distribution data) may be stored in the database. The comparison of the influenced distribution function with the other distribution functions may include comparing shape of the influenced distribution function with shape of the distribution functions of other internal attributes. As discussed above, the shape of an object located in some space is a geometrical description of the part of that space occupied by the object, as determined by its external boundary. The shape of the related distribution may be, for example, a standard pattern, such as a straight line, parabola, hyperbola, or any other non-standard patterns. The influenced distribution function may be compared with the other distribution functions to determine if the influenced distribution function is correlated with any of the other distribution functions, corresponding to other attributes. In one embodiment, "correlation" may be defined by leveraging the concept of "similarity" as defined in Geometry. As discussed above, two geometrical objects are similar if they both have the same shape. In geometry, two objects have the same shape if one can be transformed to the other by a combination of translations, rotations (together also called rigid transformations), and uniform scaling. In one embodiment, the influenced distribution function may be determined to be correlated with any of the other distribution functions if the correlation between the influenced distribution function and the other influencing distribution functions is greater that a matching probability score.

The system may compare the influenced distribution function with the other distribution functions based on a "heuristical" approach. Heuristics refer to experience-based techniques for problem solving, learning, and discovery. In one embodiment, the system may compare the influenced distribution function with the other distribution functions based on "similarity heuristics" approach. "Similarity heuristic" is a psychological heuristic pertaining to how people make judgments based on similarity. The "similarity heuristic" directly emphasizes learning from past experience. The system may determine the distribution functions of other attributes before determining the influenced distribution function. The determined distribution functions of other attributes may be stored in the system. The system may compare the stored distribution function (which are considered as past experiences) of other attributes with the influenced distribution function of the influenced attribute.

The system may also compare the influenced distribution function with the other distribution functions based on a case based reasoning. Case based reasoning is the process of solving new problems based on solutions of similar past problems. Case based reasoning may be performed using several different methods, for example, Pareto distribution and langrage multipliers. Pareto distribution is a power law probability distribution that coincides with social, scientific, geophysical, actuarial, and many other types of observable phenomena. The Pareto principle (also known as the 80-20 rule, the law of the vital few, and the principle of factor sparsity) states that, for many events, roughly 80% of the effects come from 20% of the causes. In mathematical optimization, the method of Lagrange multipliers provides a strategy for finding the maxima and minima of a function subject to constraints. During the comparison using Langrange multipliers, the influenced distribution function may be considered as the function and the distribution function of other attributes may be considered as the constraints.

In one embodiment, if the shape of the other distribution function corresponding to the other attribute is similar to the shape of the influenced distribution function, then "additional tests" are performed to determine if the influenced distribution function is related to the other distribution functions. The "additional tests" may include comparing a sample of the influenced distribution function with a sample of the distribution function of the other attribute that has a similar shape. In one embodiment, the samples being compared may be a portion of the influenced distribution function and the other distribution function for the same period of time (days, weeks, months, semester, years, etc.). In the above example, consider that the shape of the distribution function for the "availability of raw materials" influencing attribute is a straight line. In this case, the shape of the "sales of ice creams" influenced attribute and the shape (straight line) of the "availability of raw materials" influencing attribute are same. A portion (sample) of the influenced distribution function, corresponding to the "sales of ice creams" influenced attribute, for quarter 1 of year 2012 and a portion (sample) of the influencing distribution function corresponding to the "availability of raw materials" influencing attribute, for quarter 1 of year 2012 may be compared with each other. In case a similarity is determined, a correlation may be determined between the influenced distribution function and the other distribution function.

Next at block 306, based on the comparison, between the influenced distribution function and the other distribution functions, performed at block 304 a correlation is determined between the influenced distribution function and an influencing distribution function. The influencing distribution function corresponds to an influencing attribute from the other attributes. In one embodiment, the influencing distribution function of the influencing attribute is correlated to the influenced distribution function if both the influencing distribution function and the influenced distribution function have the same shape. The influenced distribution function may be correlated to any number of other distribution functions, based on the comparison performed at block 304. The correlation between influenced distribution function and the influencing distribution function may be an indication that the influenced attribute is influenced by the influencing attribute. In one embodiment, if an influenced attribute is influenced by another influencing attribute then the influenced distribution function of the influenced attribute changes according to the change in the influencing distribution function of the other attribute. In the above example, as the influenced distribution function of the "sales of ice creams" influenced attribute is correlated to the influencing distribution function of the "availability of raw materials" influencing attribute, therefore the "sales of ice creams" influenced attribute is influenced by the "availability of raw materials" influencing attribute. In this case, the influenced distribution function of the "sales of ice creams" influenced attribute changes according to the change in the influencing distribution function of the "availability of raw materials" influencing attribute.

Next at block 308, a raw distribution function of the influenced attribute is extracted using the influenced distribution function and the influencing distribution function determined to be correlated to the influenced distribution function at block 306. The raw distribution function of the influenced attribute may be determined by removing the influence of the influencing distribution function from the influenced distribution function. In one embodiment, the raw distribution function of the influenced attribute is extracted by subtracting the influencing distribution function from the influenced distribution function. The extracted raw distribution function corresponding to the influenced attribute may represent the distribution of the influenced attribute without the influence of the influencing attribute. The raw distribution function of the influenced attribute may be extracted by subtracting the influencing distribution functions of the other attributes, determined to be correlated to the influenced distribution function, from the influenced distribution function. In one embodiment, the extraction of the raw distribution function corresponding to the influenced attribute may be considered analogous to prime factorization. In number theory, prime factorization is the decomposition of a composite number into smaller non-trivial divisors, which when multiplied together equals the original integer. In this case, the influenced distribution function can be considered as the original integer and the extracted raw distribution functions corresponding to the influenced attribute and the influencing attributes may be considered as factors of this original integer obtained after the prime factorization. The influencing distribution function can then be compared with other distribution functions to determine the distribution functions correlated to the influencing distribution function.

For example, based on the comparison, it may be determined that the influencing distribution function is composed of a first raw distribution function corresponding to a first influencing attribute and a second raw distribution function corresponding to a second influencing attribute. The raw distribution function corresponding to the influenced attribute, the first raw distribution function, and the second raw distribution function are factors of the influenced distribution function, which is the original integer. In the above example, consider that the influenced distribution function of the "sales of ice creams" influenced attribute is correlated only to the influencing distribution function of the "availability of the raw materials" influencing attribute. In this case, the influenced distribution function of the "sales of ice creams" influenced attribute may be determined by subtracting the influencing distribution function corresponding to the "availability of the raw materials" influencing attribute from the influenced distribution function corresponding to the "sales of ice cream" influenced attribute. The influencing distribution function corresponding to the "availability of raw materials" influencing attribute may then be compared with other distribution functions to determine that it is composed of raw distribution functions corresponding to the "availability of raw materials" influencing attribute and the "power supply" influencing attribute (as power supply may directly influence ice, which is a raw material for the ice cream). The raw distribution functions corresponding to the "sales of ice creams" influenced attribute, the "availability of raw materials" influencing attribute, and the "power supply" influencing attribute are factors of the influenced distribution function of the "sales of raw materials" attribute. The extracted raw distribution function for the "sales of ice creams" influenced attribute may then be used for predicting the value for the "sales of ice creams" influenced attribute.

In one embodiment, the distribution data corresponding to the influenced attribute has a random distribution. For example, consider that a distribution data corresponding to the influenced attribute is a digital split data which has a random distribution. A raw distribution function of the influenced attribute cannot be determined based on the distribution data that has a random distribution. In this case, the raw distribution function corresponding to the influenced attribute may be determined by subtracting the distribution data of the influencing attribute from the distribution data of the influenced attribute to obtain a set of difference values. The distribution function representing the set of difference values may be determined as the raw distribution function of the influenced attribute.

Next at block 310, a classification is performed on the extracted raw distribution function corresponding to the influenced attribute and the influencing distribution functions influencing the influenced attribute. The classification may be performed based on a strategy received from the user. A strategy refers to a plan of action designed to achieve a particular goal. Based on the goal to be achieved the attributes may be classified, for example, as an early warning indicator, a critical indicator, a subsequent indicator, a related indicator, a weak indicator, a strong indicator, etc. In one embodiment, an attribute is classified as a critical indicator when it is directly associated with the goal. An attribute may be classified as an early warning indicator if it has a time shift before the critical indicator (the event associated with the early warning indicator occurs before the event associated with the critical indicator). Similarly, an attribute may be classified as a subsequent indicator if it has a time shift after the critical indicator. An attribute may be classified as a related indicator if the distribution data corresponding to the attribute changes at the same time as the distribution data corresponding to an attribute classified as a critical indicator. For example, consider a data center that includes several data servers. A strategy may be received from a user which has a goal to run the data servers at the optimum efficiency. The optimum efficiency of the data servers is dependent on the temperature at the data center. For example, the efficiency of the data servers may decrease when the temperature in the data center is above 30 degree centigrade and the data centers may crash if the temperature in the data center is above 50 degree centigrade. In this case, the "efficiency of the data servers" influenced attribute may be classified as a critical indicator and the "temperature in the data center" influencing attribute may be classified as an early warning indicator because after the temperature of the data server increases then the efficiency of the servers decrease. The system may monitor the values corresponding to the "temperature in the data center" influencing attribute (early warning indicator) and may take appropriate actions, such as decreasing the temperature of the air conditioner, so that the values corresponding to the "efficiency of the data servers" influenced attribute (critical indicator) is not affected.

Next at block 312, a distribution function of an external attribute is received from a user. The external attribute may be an attribute that is not present in the database. The external attributes may include, for example, political conditions (elections, regime, and wars), act of nature beyond control (earth quakes, weather impact), cultural influences (religion, example, weekend/workday pattern Christmas, Jews, Muslims), etc. In one embodiment, the distribution function of the external attribute is received when the raw distribution function of the influenced attribute cannot be extracted using the internal attributes. For example, as discussed above, the distribution data of the influenced attribute may have a random distribution for which a raw distribution function cannot be determined. In this case, the distribution function of the external attribute may be received from the user for determining the raw distribution function corresponding to the influenced attribute. In another embodiment, the user may provide the distribution function of the external attribute after extracting the raw distribution function of the influenced attribute at block 308. In this case, the user may provide the distribution function of the external attribute to check if the raw distribution function of the influenced attribute obtained at block 308 is correlated to the distribution function of the external attribute. In the above example, after obtaining the raw distribution function for the "sales of ice creams" influenced attribute a distribution function corresponding to the "weather conditions" attribute may be received from the user to determine if the raw distribution function of the "sales of ice creams" influenced attribute is correlated with the distribution function of the "weather conditions" external attribute. A "straight line" distribution function may be received from the user for the "weather conditions" external attribute.

Next at block 314, a comparison is performed between the influenced distribution function and the distribution function of the external attribute received at block 312. The comparison between the influenced distribution function and the distribution function of the external attribute function is performed similar to the comparison between the distribution function of internal attributes and the influenced distribution function at block 304. The comparison may be performed using same comparison methods as discussed above at block 304. The comparison is performed to determine if the shape of the influenced distribution function is same as the shape of the distribution function of the external attribute. Further, in case the shapes of the influenced distribution function and the distribution function of the external attributes are same, "additional tests" may be performed, which as discussed above may include comparing sample of the influenced distribution function with sample of the distribution function of the external attribute. The influenced distribution function is compared with the distribution function of the external attribute to determine a correlation between the influenced distribution function and the distribution function of the external attribute. In the above example, the shape (straight line) of the influenced distribution function corresponding to the "sales of ice creams" influenced attribute is compared with the shape (straight line) of the distribution function of the "weather conditions" external attribute.

Next at block 316, based on the comparison performed at block 314 a correlation is determined between the influenced distribution function and the distribution function of the external attribute. The correlation may be determined similar to the correlation determined at block 306. In the above example, the influenced distribution function of the "sales of ice creams" influenced attribute is determined to be correlated to the distribution function of the "weather conditions" attribute as the shape (straight line) of the influenced distribution function and the distribution function of the "weather conditions" attribute is same.

Next at block 318, the raw distribution function of the influenced attribute is extracted using the influenced distribution function and the distribution function of the external attribute, determined to be correlated to the influenced distribution function at block 316. In one embodiment, the raw distribution function of the influenced attribute is determined by subtracting the distribution function of the external attribute from the influenced distribution function. In the above example, the raw distribution function for the "sales of ice creams" is extracted by subtracting the distribution function of the "weather conditions" attribute from the influenced distribution function of the "sales of ice creams" influenced attribute.

Finally at block 320, the extracted raw distribution function of the influenced attribute and the distribution function of the external distribution function are classified. The classification may be performed similar to the classification discussed above at block 310. In the above example, the "sales of ice creams" influenced attribute may be classified as a critical attribute and the "weather conditions" influencing attribute is classified as a related indicator. As when the temperature (distribution data for "weather conditions" attribute) increases the sales (distribution data for "sales of ice creams" influenced attribute) increases. Based on this classification, a system at company XYZ, manufacturing ice creams, may obtain the weather chart, which included temperature information (distribution data for related indicator "weather conditions" attribute) for future dates, for example year 2012, and based on that plan the logistics, the availability of raw materials, etc. so that the sales, which is the distribution data for the critical indicator "sales of ice cream", is not affected.

Figure 4:
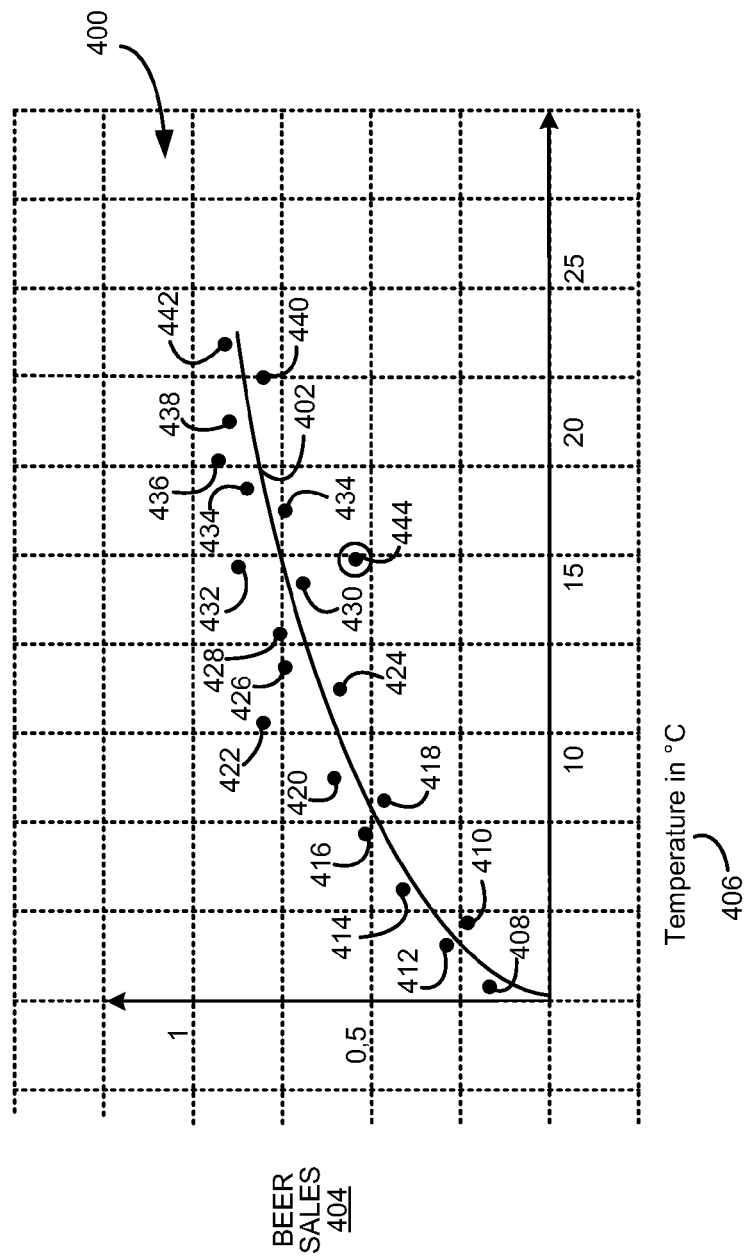
FIG. 4 is an exemplary graph illustrating determination of an influenced distribution function of a "beer sales" influenced attribute, according to an embodiment.

FIG. 4 is an exemplary graph 400 illustrating determination of an influenced distribution function 402 of a "beer sales" influenced attribute, according to an embodiment. The "beer sales" influenced attribute is influenced by a "temperature" influencing attribute. As shown, the graph 400 is a "beer sales" data 404 versus "temperature" 406 graph. The distribution data 408-444 corresponding to the "beer sales" attribute is plotted on the graph 400. The influenced distribution function 402 of the "beer sales" attribute may be determined by determining "outliers" in the distribution data 408-444. As discussed above, the "outliers" in the distribution data can be determined by the "least squares" method. Based on this method, it is determined that the distribution data 444 is an "outlier" and can be ignored for determining the influenced distribution function 402. Finally, the influenced distribution function 402 is determined based on the remaining distribution data 408-442.

Figure 5:
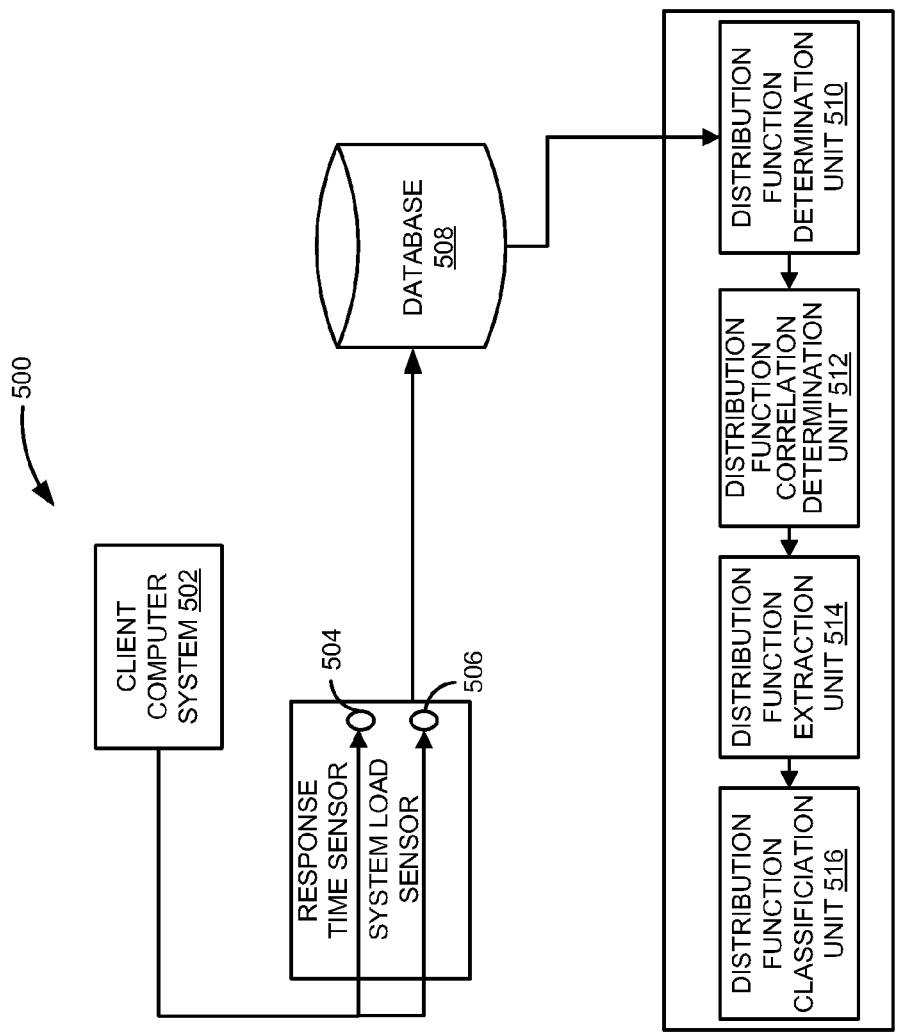
FIG. 5 is an exemplary block diagram illustrating a system for determining the raw distribution function of a "response time" influenced attribute, according to an embodiment.

FIG. 5 is an exemplary block diagram illustrating a system 500 for determining the raw distribution function of a "response time" influenced attribute, according to an embodiment. A strategy may be received to maintain the response time for a client computer system 502 to be below 1 second. The system 500 includes a response time sensor 504 and a system load sensor 506 to measure the distribution data corresponding to the "response time" influenced attribute, and the "system load" influencing attribute, respectively. As discussed above, due to the memory constraints of a database 508, the distribution data corresponding to the "response time" influenced attribute and the "system load" influencing attribute are pre-aggregated and then stored in the database 508. Accordingly, the raw distribution function corresponding to the "response time" influenced attribute, and the relationship between the raw distribution function corresponding to the "response time" influenced attribute and the influencing distribution function corresponding to the "system load" influencing attribute cannot be determined using the data stored in the database 508.

Next, a distribution function determination unit 510 determines the influenced distribution function corresponding to the "response time" influenced attribute and an influencing distribution function corresponding to the "system load" influencing attribute. Next, a distribution function correlation determination unit 512 compares the influenced distribution function of the "response time" influenced attribute and the influencing distribution function of the "system load" influencing attribute to determine if these distribution functions are correlated to each other. Next a distribution function extraction unit 514 extracts the raw distribution function of the "response time" influenced attribute by subtracting the influencing distribution function of the "system load" influencing attribute from the influenced distribution function of the "response time attribute". Finally, a distribution function classification unit 516 classifies the extracted raw distribution function of the "response time" influenced attribute as a critical indicator and the influencing distribution function of the "system load" influencing attribute as a related indicator.

FIG. 6 is an exemplary graph illustrating an influencing distribution function 600 of the "system load" influencing attribute determined by the distribution function determination unit 510 of FIG. 5, according to an embodiment. As shown, the shape of the influencing distribution function 600 is a parabola. The influencing distribution function 600 also includes a peak 602 which represents additional system load received at the client computer 502 of FIG. 5. For example, if the normal system load at the client computer 502 is 3000 files/minutes then the additional system load may be 5000 files/minute.

FIG. 7 is an exemplary graph illustrating an influenced distribution function 700 of the "response time" influenced attribute determined by the distribution function determination unit 510 of FIG. 5, according to an embodiment. As shown, the shape of the influenced distribution function 700 is a parabola. The influenced distribution function 700 also includes a peak 702. As the attribute "system load" is influenced by the attribute "response time", the peak 702 may be due to the additional system load, corresponding to the "system load" influencing attribute, represented by peak 602 in FIG. 6.

FIG. 8 is an exemplary graph illustrating a raw distribution function 800 of the "response time" influenced attribute extracted by the distribution function extraction unit 514 of FIG. 5, according to an embodiment. The raw distribution function 800 may be extracted by subtracting the "system load" influencing distribution function 600 corresponding to the "system load" influencing attribute from the "response time" influenced distribution function 700 corresponding to the "response time" influenced attribute. As shown, the raw distribution function 800 corresponding to the "response time" influenced attribute does not include the peak 702 of the "response time" influenced distribution function 700 as the influence of the "system load" influencing attribute has been removed from the "response time" influenced attribute. As discussed above, the "system load" influencing attribute is classified as an associated indicator and the "response time" influenced attribute is classified as a critical indicator. Therefore, the "system load" value can be monitored and solutions, such as, for example, providing an additional system, may be provided to maintain the "system load" value so that the value corresponding to the "response time" influenced attribute (critical indicator) is maintained at the desired value (1 second).

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls or web services being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 9:
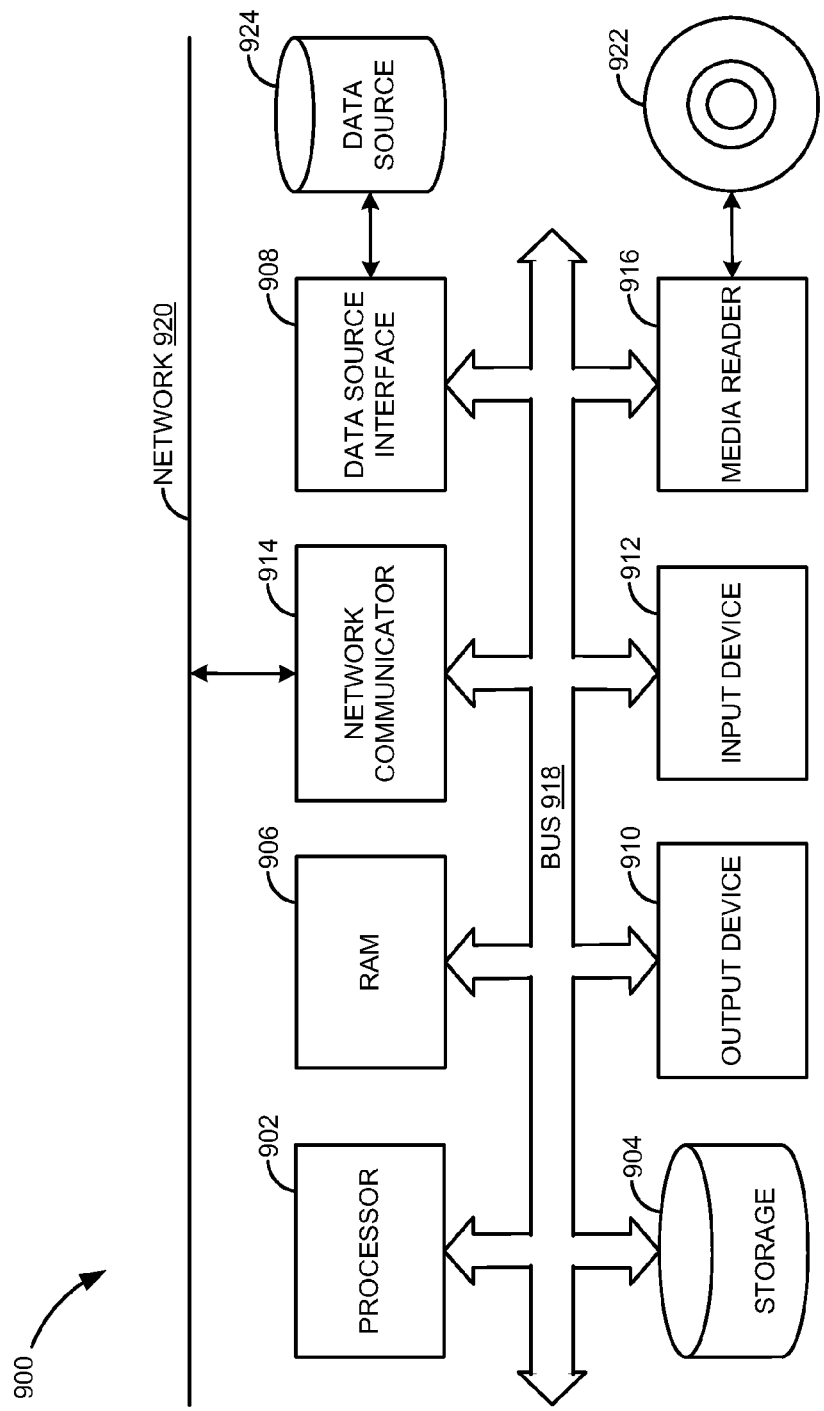
FIG. 9 is a block diagram illustrating a computing environment in which the techniques described for pattern recognition of a distribution function can be implemented, according to an embodiment.

FIG. 9 is a block diagram of an exemplary computer system 900. The computer system 900 includes a processor 902 that executes software instructions or code stored on a computer readable storage medium 922 to perform the above-illustrated methods of the invention. The computer system 900 includes a media reader 916 to read the instructions from the computer readable storage medium 922 and store the instructions in storage 904 or in random access memory (RAM) 906. The storage 904 provides a large space for keeping static data where at least some instructions could be stored for later execution. The stored instructions may be further compiled to generate other representations of the instructions and dynamically stored in the RAM 906. The processor 902 reads instructions from the RAM 906 and performs actions as instructed. According to one embodiment of the invention, the computer system 900 further includes an output device 910 (e.g., a display) to provide at least some of the results of the execution as output including, but not limited to, visual information to users and an input device 912 to provide a user or another device with means for entering data and/or otherwise interact with the computer system 900. Each of these output devices 910 and input devices 912 could be joined by one or more additional peripherals to further expand the capabilities of the computer system 900. A network communicator 914 may be provided to connect the computer system 900 to a network 920 and in turn to other devices connected to the network 920 including other clients, servers, data stores, and interfaces, for instance. The modules of the computer system 900 are interconnected via a bus 918. Computer system 900 includes a data source interface 908 to access data source 924. The data source 924 can be accessed via one or more abstraction layers implemented in hardware or software. For example, the data source 924 may be accessed by network 920. In some embodiments the data source 924 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method for determining a raw distribution function corresponding to an influenced attribute of a plurality of attributes, the method comprising:
   comparing, by a processor of the computer, an influenced distribution function corresponding to the influenced attribute with other distribution functions, stored in a memory of the computer, corresponding to other attributes of the plurality of attributes;
   based on the comparison, determining, by the processor of the computer, a correlation between the influenced distribution function and an influencing distribution function from the other distribution functions, the influencing distribution function corresponding to an influencing attribute from the other attributes; and
   based on the determination, extracting, by the processor of the computer, the raw distribution function corresponding to the influenced attribute using the influenced distribution function and the influencing distribution function.

2. The computer implemented method according to claim 1, further comprising:
   determining, by the processor of the computer, the influenced distribution function based on distribution data, stored in the memory of the computer, corresponding to the influenced attribute.

3. The computer implemented method according to claim 2, wherein determining the influenced distribution function includes:
   analyzing, by the processor of the computer, the distribution data corresponding to the influenced attribute;
   based on the analysis, determining, by the processor of the computer, whether the distribution data corresponding to the influenced attribute is symmetric; and
   based on the determination, determining, by the processor of the computer, the influenced distribution function based on at least a portion of the distribution data.

4. The computer implemented method according to claim 1, wherein extracting the raw distribution function includes:
   subtracting, by the processor of the computer, the influencing distribution function from the influenced distribution function to obtain the raw distribution function corresponding to the influenced attribute.

5. The computer implemented method according to claim 1, further comprising:
   determining whether the raw distribution function corresponding to the influenced attribute is extracted based on the determined correlation between the influenced distribution function and the influencing distribution function;
   based on the determination, receiving a distribution function corresponding to an external attribute;
   comparing, by the processor of the computer, the influenced distribution function with the received distribution function;
   based on the comparison, determining, by the processor of the computer, a correlation between the influenced distribution function and the received distribution function; and
   based on the determination, extracting, by the processor of the computer, the raw distribution function corresponding to the influenced attribute using the influenced distribution function and the received distribution function.

6. The computer implemented method according to claim 5, wherein extracting the distribution function includes:
   subtracting, by the processor of the computer, the received distribution function from the influenced distribution function to obtain the raw distribution function corresponding to the influenced attribute.

7. The computer implemented method according to claim 5, further comprising:
   classifying, by the processor of the computer, the raw distribution function related to the influenced attribute and the received distribution function.

8. The computer implemented method according to claim 1, further comprising:
   classifying, by the processor of the computer, the raw distribution function related to the influenced attribute and the influencing distribution function.

9. The computer implemented method according to claim 1, further comprising:
   determining, by the processor of the computer, whether the raw distribution function corresponding to the influenced attribute is extracted based on the determined correlation between the influenced distribution function and the influencing distribution function;
   based on the determination, subtracting, by the processor of the computer, distribution data corresponding to one of the other attributes from distribution data corresponding to the influenced attribute; and
   determining, by the processor of the computer, the raw distribution function corresponding to the influenced attribute based on result of the subtraction.

10. An article of manufacture including a non-transitory computer readable storage medium to tangibly store instructions, which when executed by a computer, cause the computer to:
- compare an influenced distribution function corresponding to an influenced attribute with other distribution functions corresponding to other attributes of a plurality of attributes;
- based on the comparison, determine a correlation between the influenced distribution function and an influencing distribution function from the other distribution functions, the influencing distribution function corresponding to an influencing attribute from the other attributes; and
- based on the determination, extract the raw distribution function corresponding to the influenced attribute using the influenced distribution function and the influencing distribution function.

11. The article of manufacture according to claim 10, further comprising instructions which when executed by the computer further causes the computer to:
- determine the influenced distribution function based on distribution data, stored in a memory of the computer, corresponding to the influenced attribute.

12. The article of manufacture according to claim 11, further comprising instructions which when executed by the computer further causes the computer to:
- analyze the distribution data corresponding to the influenced attribute;
- based on the analysis, determine if the distribution data corresponding to the influenced attribute is symmetric; and
- based on the determination, determine the influenced distribution function corresponding to the influenced attribute based on at least a portion of the distribution data.

13. The article of manufacture according to claim 10, further comprising instructions which when executed by the computer further causes the computer to:
- subtract the influencing distribution function from the influenced distribution function to obtain the raw distribution function corresponding to the influenced attribute.

14. The article of manufacture according to claim 10, further comprising instructions which when executed by the computer further causes the computer to:
- determine whether the raw distribution function corresponding to the influenced attribute is extracted based on the determined correlation between the influenced distribution function and the influencing distribution function;
- based on the determination, receive a distribution function corresponding to an external attribute;
- compare the influenced distribution function with the received distribution function;
- based on the comparison, determine a correlation between the influenced distribution function and the received distribution function; and
- based on the determination, extract the raw distribution function related to the influenced attribute using the influenced distribution function and the received distribution function.

15. The article of manufacture according to claim 14, further comprising instructions which when executed by the computer further causes the computer to:
- subtract the distribution function from the influenced distribution function to obtain the raw distribution function corresponding to the influenced attribute.

16. A computer system for determining a raw distribution function corresponding to an influenced attribute of a plurality of attributes, the computer system comprising:
- a memory to store a program code; and
- a processor communicatively coupled to the memory, the processor configured to execute the program code to:
  - compare an influenced distribution function corresponding to the influenced attribute with other distribution functions corresponding to other attributes of the plurality of attributes;
  - based on the comparison, determine a correlation between the influenced distribution function and an influencing distribution function from the other distribution functions, the influencing distribution function corresponding to an influencing attribute from the other attributes; and
  - based on the determination, extract the raw distribution function corresponding to the influenced attribute using the influenced distribution function and the influencing distribution function.

17. The system of claim 16, wherein the processor further executes the program code to:
- determine the influenced distribution function based on distribution data, stored in a memory of the computer, corresponding to the influenced attribute.

18. The system of claim 17, wherein the processor further executes the program code to:
- analyze the distribution data corresponding to the influenced attribute;
- based on the analysis, determine whether the distribution data corresponding to the influenced attribute is symmetric; and
- based on the determination, determine the influenced distribution function corresponding to the influenced attribute based on at least a portion of the distribution data.

19. The system of claim 16, wherein the processor further executes the program code to:
- subtract the influencing distribution function from the influenced distribution function to extract the raw distribution function corresponding to the influenced attribute.

* * * * *